Patented Aug. 3, 1937

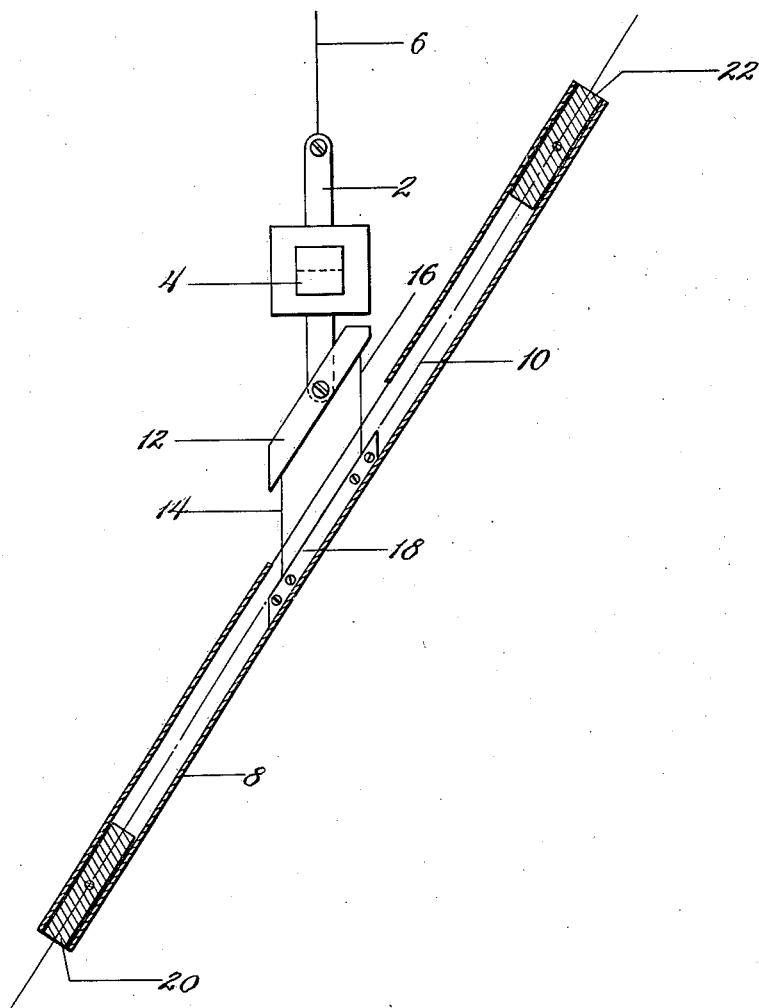

2,089,164

UNITED STATES PATENT OFFICE 2,089,164

SUSPENSION FOR EÖTVÖS BALANCE

Hermann Imhof, Berlin-Friedenau, Germany, assignor to Askania-Werke Aktiengesellschaft, vormals Centralwerkstatt Dessau und Carl Bamberg Friedenau, Berlin-Friedenau, Germany, a corporation of Germany Application December 7, 1934, Serial No. 756,523
In Germany December 20, 1933

7 Claims. (Cl. 265—1.5)

This invention relates to torsion balances and more particularly to suspensions for the balance beam of such balances, especially of the Eötvös type.

The invention has for its object among other things to provide means whereby the suspension of the balance beam shall be such that movements of the balance beam, such as oscillations or rocking movements thereof about its main inertia axis, which might produce errors in the readings or recordings on account of the resultant quivering or trembling of the reflected ray of light used for such readings or recordings, shall have no effect whatever upon the reflecting surface or prism by which the ray is reflected, thus altogether eliminating such quivering or trembling of the reflected ray due to said movements, and therefore the errors heretofore due to such movements of said balance beam.

Other aims and objects of the invention will appear in the course of the following description.

The invention will be clearly understood from the following description taken in connection with the accompanying drawing of one embodiment of the invention herein given for illustrative purposes, the true scope of the invention being more particularly pointed out in the appended claims.

The accompanying figure is a side elevation of one illustrative embodiment of the invention, certain parts being shown in section.

The invention is herein illustratively shown in its application to an inclined or oblique balance beam, as the invention is particularly useful in torsion balances provided with olbiquely suspended balance beams.

Only so much structure has been shown as appears necessary to a full understanding of the invention by those skilled in the art. For a detailed description of a torsion balance with inclined balance beam reference may be had to a co-pending application Serial No. 624,776, filed July 26, 1932, wherein one illustrative embodiment of such a torsion balance is described.

Referring to the drawing, torsion means, herein a torsion thread for example, is shown at 6. The bright reflecting surface, prism 4 for example, is suspended from said torsion means by suitable reflecting surface carrying means, herein conveniently a member or rod 2. The balance beam, herein of the inclined type, is shown at 8, but said balance beam is not, as has heretofore been the case, rigidly connected to said rod 2, that is to say to said prism, but is so suspended therefrom, or articulated thereto, that it can swing or rock about an axis 10 which coincides substantially with the main inertia axis of said beam. The invention contemplates the use of any suitable means for this purpose which will permit of such swinging or rocking movement; in the illustrative embodiment of the invention shown, said means conveniently comprises two members, herein two flexible connections, threads or wires 14, 16, for example, secured to a member or rod 12 fixed to said rod 2 in parallelism with said balance beam, the points of connection or articulation of said members 14 and 16 to said balance beam being spaced from each other and located on or in close proximity to the main inertia axis of said beam which passes through the weights, herein two weights 20 and 22, secured within said beam. With the flexible connections 14 and 16 used in the illustrative embodiment of the invention, this result is conveniently obtained by clamping the lower ends of said flexible connection in a clamp 18 of any suitable conventional construction, said clamp being located within the hollow balance beam and said two flexible connections extending through a suitable aperture provided for this purpose in the wall of said beam. In making any swinging or rocking movements about its main inertia axis, the balance beam will swing about the two points of attachment or articulation therewith of said flexible connections, with the result that such swinging or rocking movements will not be transmitted to the reflecting surface or prism 4, as has heretofore been the case where the balance beam was rigidly connected to said reflecting surface or prism.

It has been attempted to overcome the quivering or trembling of the diverted or reflected ray of light, due to oscillation or rocking movement of the balance beam about its main inertia axis, by using an angle mirror or right angle isosceles prism instead of an ordinary mirror, said angle mirror or prism being mounted on the balance beam supporting rod with the right angle edge thereof parallel to said main inertia axis. Such a construction, however, is objectionable, particularly in the case of inclined or oblique balance beams, because if the entire torsional balance should for any reason be inclined, as may occur for example by deviation of the axis of the torsional balance from the perpendicular, deviations of the reflected light rays may occur which it is impossible to distinguish from those caused by the Eötvös effect, thus giving rise to errors in the measurements obtained.

The present invention overcomes all these difficulties by rendering it impossible for oscillatory or rocking movements of said balance beam about its main inertia axis to be transmitted to the light reflecting mirror or prism. It is therefore not necessary that said mirror or prism be affixed to its carrying means in any particular way. If an angle mirror or right angled prism be used, the right angle edge thereof may be positioned horizontally, so that inclinations of the torsional balance will not occasion any movements of the indicating or recording light rays which might interfere or injuriously affect the movements of the light ray to be recorded due to the Eötvös effect.

I am aware that the invention may be embodied in other specific forms without departing from the spirit or essential attributes thereof, and I therefore desire the present embodiment of the invention to be considered in all respects as illustrative and not descriptive, reference being had to the appended claims rather than to the above description to indicate the scope of the invention.

I claim:

1. Suspension for balance beams, more particularly of the inclined type, for torsion balances, comprising, in combination, a torsion thread; bright, light ray reflecting means; carrying means for the latter suspended from said torsion thread; a member secured to said carrying means in parallelism with the balance beam; and two flexible members connected to said first-named member and to the balance beam, the points of connection of said flexible members with said first-named member and with said balance beam being spaced from each other and said points of connection with said balance beam being located substantially on the main inertia axis of the latter.

2. Suspension for balance beams, more particularly of the inclined type, for torsion balances, comprising, in combination, torsion means; a prism suspended from said torsion means; means to suspend said balance beam and said prism, said means comprising two members articulated to the balance beam, the points of articulation of said two members with said balance beam being spaced from each other and located substantially on the main inertia axis of said balance beam, to permit movement of said balance beam about its main inertia axis without moving said prism.

3. Suspension for balance beams, more particularly of the inclined type, for torsion balances, comprising, in combination, torsion means; bright light ray reflecting means; a first suspension means to suspend said light ray reflecting means from said torsion means; and a second suspension means to suspend said balance beam from said first suspension means, said second suspension means being articulately connected to said balance beam substantially upon its main inertia axis, to permit movement of said balance beam about said axis without moving said light ray reflecting means.

4. Suspension for balance beams, more particularly of the inclined type, for torsion balances, comprising in combination torsion means; bright, light ray reflecting means; carrying means for the latter suspended from said torsion means; and flexible means connected to said carrying means and to the balance beam, the points of connection of said flexible means with said balance beam being located substantially on the main inertia axis of the latter.

5. Suspension for balance beams, more particularly of the inclined type, for torsion balances, comprising in combination torsion means; bright, light ray reflecting means; carrying means for the latter suspended from said torsion means; and means to suspend the balance beam from said carrying means for movement of said balance beam about its main inertia axis without affecting said light ray reflecting means.

6. Suspension for balance beams, more particularly of the inclined type, for torsion balances, comprising, in combination, torsion means; bright, light ray reflecting means suspended from said torsion means; and means comprising two flexible members to suspend a balance beam from said light ray reflecting means for swinging movement of said balance beam about its main inertia axis, the points of connection of said flexible members to said balance beam being located substantially upon the main inertia axis of said balance beam.

7. Suspension for balance beams, more particularly of the inclined type, for torsion balances, comprising, in combination, torsion means; bright, light ray reflecting means; carrying means therefor suspended from said torsion means; and means articulately to suspend a balance beam from said carrying means to permit movement of said balance beam about its main inertia axis without moving said light ray reflecting means.

HERMANN IMHOF.